United States Patent
Hermann et al.

(10) Patent No.: US 9,587,580 B2
(45) Date of Patent: Mar. 7, 2017

(54) CONTROLLING THE FUEL PRESSURE IN AN INJECTION SYSTEM

(71) Applicant: Robert Bosch GmbH, Stuttgart (DE)

(72) Inventors: Lars Hermann, Wuxi (CN); Martin Friedrich, Stuttgart (DE); Christoph Benz, Uhingen (DE); Oliver Schulz, Goeppingen (DE); Thomas Wieland, Ditzingen (DE); Roberto Scarfone, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 14/764,237

(22) PCT Filed: Jan. 28, 2014

(86) PCT No.: PCT/EP2014/051568
§ 371 (c)(1),
(2) Date: Jul. 29, 2015

(87) PCT Pub. No.: WO2014/118140
PCT Pub. Date: Aug. 7, 2014

(65) Prior Publication Data
US 2015/0369164 A1 Dec. 24, 2015

(30) Foreign Application Priority Data
Jan. 29, 2013 (DE) .......... 10 2013 201 355

(51) Int. Cl.
*F02D 41/38* (2006.01)
*F02D 41/12* (2006.01)
(Continued)

(52) U.S. Cl.
CPC ......... *F02D 41/3845* (2013.01); *B60W 10/02* (2013.01); *B60W 10/06* (2013.01);
(Continued)

(58) Field of Classification Search
CPC .... F02D 41/3845; F02D 41/12; F02D 41/123; B60W 30/18072; B60W 30/18136; B60W 10/02; B60W 10/06; B60W 10/08
See application file for complete search history.

(56) References Cited

U.S. PATENT DOCUMENTS

| | | | |
|---|---|---|---|
| 6,408,823 B1 * | 6/2002 | Takahashi | F02M 45/00 123/446 |
| 7,565,898 B2 * | 7/2009 | Fukasawa | F02D 41/042 123/299 |

(Continued)

FOREIGN PATENT DOCUMENTS

| | | |
|---|---|---|
| DE | 102006000396 | 2/2007 |
| DE | 102009017472 | 10/2010 |

(Continued)

OTHER PUBLICATIONS

International Search Report for Application No. PCT/EP2014/051568 dated May 2, 2014 (English Translation, 3 pages).

*Primary Examiner* — Hung Q Nguyen
*Assistant Examiner* — Xiao Mo
(74) *Attorney, Agent, or Firm* — Michael Best & Friedrich LLP

(57) ABSTRACT

A method for controlling a pressure (32, 34) in an injection system (14) for an engine (12) of a vehicle (10) comprises the following steps: determining whether the vehicle (10) is decelerating; reducing the delivery rate of a high-pressure pump (16) that supplies fuel to the injection system (14); reducing the pressure in the injection system (14) to a standstill pressure ($p_s$) by means of idle operation of the engine (12); estimating a standstill time ($t_1$) at which the vehicle (10) comes to a standstill; and reducing the delivery rate of the high-pressure pump (16) before the standstill time
(Continued)

($t_1$) is reached, such that the standstill pressure ($p_s$) is attained in the injection system (14) at the standstill time ($t_1$).

10 Claims, 3 Drawing Sheets

(51) Int. Cl.
*B60W 10/02* (2006.01)
*B60W 10/06* (2006.01)
*B60W 10/08* (2006.01)
*B60W 20/00* (2016.01)
*B60W 30/18* (2012.01)

(52) U.S. Cl.
CPC ........... *B60W 10/08* (2013.01); *B60W 20/00* (2013.01); *B60W 30/18072* (2013.01); *B60W 30/18136* (2013.01); *F02D 41/12* (2013.01); *F02D 2200/0602* (2013.01); *F02D 2200/501* (2013.01); *Y02T 10/6286* (2013.01)

(56) References Cited

U.S. PATENT DOCUMENTS

| | | | |
|---|---|---|---|
| 2004/0099248 A1* | 5/2004 | Ito | F02D 35/025 123/457 |
| 2005/0103312 A1* | 5/2005 | Uchiyama | F02D 41/221 123/457 |
| 2007/0000478 A1* | 1/2007 | Sadakane | F02D 41/38 123/431 |
| 2008/0308065 A1* | 12/2008 | Imai | F02D 41/1497 123/299 |
| 2009/0107227 A1* | 4/2009 | Ishizuka | F02D 41/0072 73/114.74 |
| 2010/0048352 A1 | 2/2010 | Yamamoto | |
| 2011/0112736 A1 | 5/2011 | Nakade et al. | |

FOREIGN PATENT DOCUMENTS

| | | |
|---|---|---|
| EP | 1193386 | 4/2002 |
| EP | 1707784 | 10/2006 |
| JP | 2009269430 | 11/2009 |
| JP | 2010019088 | 1/2010 |

* cited by examiner

CONTROLLING THE FUEL PRESSURE IN AN INJECTION SYSTEM

BACKGROUND OF THE INVENTION

The invention relates to a method, to a computer program and to a computer-readable medium for controlling a pressure in an injection system for an engine of a vehicle.

In order to save fuel, vehicles can be equipped with an "automatic start/stop system", which automatically switches off the engine of the vehicle when the vehicle is stationary and restarts it automatically for driving onward.

On vehicles with high pressure injection systems, such as diesel vehicles, it may be advantageous if the pressure in the injection system is below an idling pressure (e.g. approximately 500 bar) when starting the engine in order, for example, to ensure a defined and thermodynamically optimum engine start. For this purpose, the residual pressure remaining in the injection system can be deliberately reduced further during the engine stoppage (e.g. to approximately 300 bar).

Particularly for commercial vehicles, injection systems or the injection system are generally designed for emergency running. That is to say, they have installed pressure control valves which ensure a certain minimum injection pressure (e.g. approximately 900 bar), thus allowing continued operation of the vehicle in the event of faults. This pressure is normally above the idling pressure, making it necessary to reduce the injection pressure to attain the idling pressure, e.g. by means of the injections themselves.

SUMMARY OF THE INVENTION

It is the object of the invention to reduce the fuel consumption of a vehicle having an internal combustion engine.

One aspect of the invention relates to a method for controlling a pressure in an injection system for an engine of a vehicle. For example, the engine can be a diesel engine, which can be supplied with fuel by a high-pressure pump via a high-pressure injection system.

According to one embodiment of the invention, the method comprises the following steps: determining whether the vehicle is decelerating; reducing the delivery rate of a high-pressure pump that supplies fuel to the injection system; and reducing the pressure in the injection system to a standstill pressure by means of idle operation of the engine.

For example, it is possible to determine in an electronic control unit whether a driver of the vehicle has removed their foot from the accelerator or, more generally, whether the driver wants the vehicle to decelerate. A desired deceleration can also be determined from current vehicle data, such as the current speed.

The delivery rate of the high-pressure pump can be reduced by closing a suction control valve at the inlet of the pump. It is possible for the delivery volume of the high-pressure pump to be reduced to 0.

The pressure in the injection system can first of all be reduced by means of a pressure control valve between the high-pressure pump and the injection system in a procedure in which fuel is passed back ahead of the inlet of the high-pressure pump by means of the pressure control valve. This pressure control valve can be embodied to maintain a predefined minimum pressure.

The pressure in the injection system can furthermore be reduced by discharging fuel into the engine from the injection system by means of injections.

The method furthermore comprises the following steps: estimating a standstill time at which the vehicle comes to a standstill; and reducing the delivery rate of the high-pressure pump before the standstill time is reached, with the result that the standstill pressure is attained in the injection system at the standstill time. In this way, the engine can be switched off precisely when the vehicle stops or at least shortly after since a standstill pressure by means of which the engine can subsequently be restarted is already present in the injection system at this time or shortly after. In this way, it is possible to save fuel since it is not necessary to allow the engine to continue running in order to reduce the pressure in the injection system after the vehicle stops.

In particular, the recovery phases present in the case of hybrid vehicles and/or start/stop vehicles for fuel economy do not have to be significantly affected. Extending the continued running of the engine when the vehicle is stationary, which is likewise relevant to consumption, is avoided.

According to one embodiment of the invention, the standstill time is estimated on the basis of an average deceleration since the beginning of the deceleration of the vehicle. In order to ensure sufficient accuracy of the pre-calculation of the time until the vehicle is stationary, the mean deceleration can be checked at an appropriate resolution.

According to one embodiment of the invention, the method furthermore comprises the following step: determining a time period required to reduce the pressure of the injection system to the standstill pressure by means of idle operation. The delivery rate of the high-pressure pump can be reduced at a time which is (substantially precisely) in the determined time period before the standstill time. In other words, the time period required to reduce the pressure can be subtracted from the estimated standstill time in order to determine the time to reduce the pressure in the injection system.

According to one embodiment of the invention, the time period is calculated on the basis of a volume of the injection system and an injected volume of fuel in idle operation. If the high-pressure pump is no longer delivering any fuel, it is possible, for example, to calculate a fuel volume which must be discharged via the injection system in order to reduce the pressure to the desired value, i.e. the standstill pressure.

According to one embodiment of the invention, the method furthermore comprises the following step: operating the engine in an overrunning mode and/or a recovery mode during a time period in which the vehicle is decelerating, with the result that the pressure in the injection system is reduced to a minimum injection pressure defined by a pressure control valve. In this case, the minimum injection pressure is the pressure from which the pressure in the injection system is to be reduced to the standstill pressure. In order to bring the engine to the idling mode, the engine can then be separated from the drive train when the delivery rate of the high-pressure pump is reduced.

According to one embodiment of the invention, the method furthermore comprises the following step: operating the engine in an idling mode during a time period in which the vehicle is decelerating, with the result that the pressure in the injection system is reduced to an idling pressure. The engine can be separated from the drive train when the vehicle begins to decelerate. In this case, the idling pressure is the pressure from which the pressure in the injection system is to be reduced to the standstill pressure.

In both cases, the engine is separated from the drive train before the vehicle comes to a standstill. By means of the method, the coupling time can thus be brought forward.

Another aspect of the invention relates to a computer program which, when performed on a processor, causes the processor to carry out the steps of the method as it is described above and below. The method can be implemented in a control unit in a vehicle by providing a suitable software function for representing or timing the injection pressure reduction. The injection hardware does not have to be modified here.

Another aspect of the invention relates to a computer-readable medium on which a computer program of this kind is stored. The computer-readable medium can be a ROM, EPROM or flash memory, for example. It is also possible for the computer-readable medium to be a floppy disk or a hard disk.

Another aspect of the invention relates to a control unit for controlling the pressure in an injection system, which is embodied to carry out the method as it is described above and below. For example, the control unit can have a processor which is embodied to carry out the abovementioned computer program.

Another aspect of the invention relates to a vehicle, e.g. a commercial vehicle, such as a truck, excavator or bus. However, it is also possible for the vehicle to be a motor car.

According to one embodiment of the invention, the vehicle comprises an engine, an injection system for injecting fuel into the engine, a high-pressure pump for supplying the injection system with fuel, and a control unit as it is described above and below.

The engine can be, for example, a diesel engine which comprises a common rail injection system as an injection system.

The vehicle can furthermore be a hybrid vehicle having an electric motor, which can be used as a generator in the recovery mode of the vehicle, for example.

In summary, the method and the control unit can be used to enable vehicles having a conventional commercial vehicle injection system to reduce the pressure in the injection system through a deliberate injection pressure reduction before engine stop phases to the value required for restarting the engine.

BRIEF DESCRIPTION OF THE DRAWINGS

Illustrative embodiments of the invention are described in detail below with reference to the attached figures.

In principle, identical or similar parts are provided with the same reference signs.

DETAILED DESCRIPTION

Figure 1:
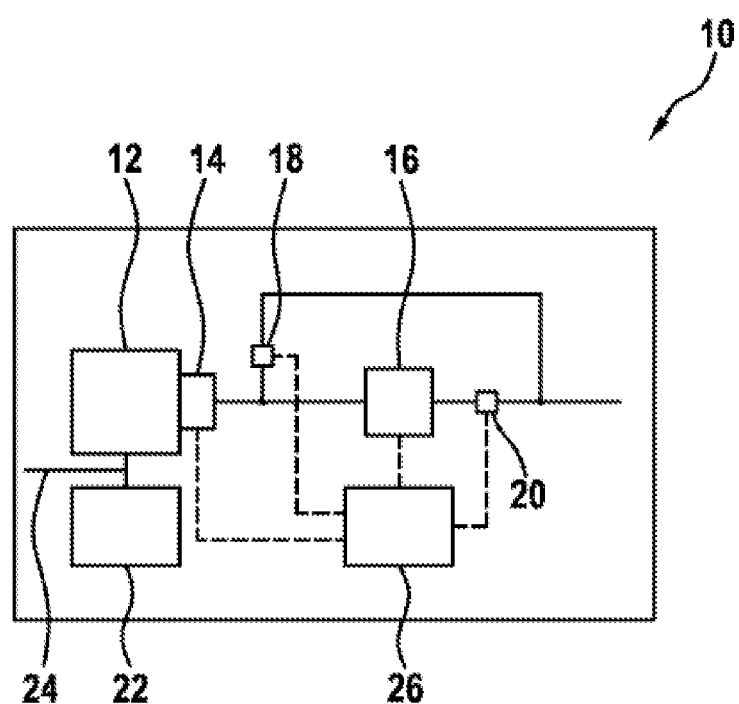
FIG. 1 shows schematically a vehicle according to one embodiment of the invention.

FIG. 1 shows schematically a vehicle 10, which comprises an internal combustion engine 12 as drive, which can be supplied with fuel by means of an injection system 14. For this purpose, the vehicle 10 has a high-pressure pump 16, which can deliver fuel at high pressure into the injection system 14.

By means of the injection system 14, fuel can be injected into the engine 12. By means of the quantity and timing of the injection, it is possible here to determine how much fuel per unit time is dispensed to the engine by the injection system.

By means of a pressure control valve 18, which is situated between the high-pressure pump and the injection system, the pressure in the injection system 14 can be controlled. For pressure compensation, fuel can be fed back out of the injection system 14 into the low-pressure circuit ahead of the high-pressure pump 16 via the pressure control valve 18. Here, the pressure control valve 18 is embodied in such a way that a minimum injection pressure is maintained, even when the pressure control valve 18 is open. In this way, it is possible to ensure that the vehicle 10 remains operational, even when there is a fault in the pressure control valve 18.

By means of a suction control valve 20, which is arranged at the inlet of the high-pressure pump, it is possible to adjust how much fuel the high-pressure pump 16 delivers. The more the suction control valve 20 is closed, the further the delivery rate of the high-pressure pump 16 falls.

In addition to the internal combustion engine 12, the vehicle can also comprise an electric motor 22, which, just like the internal combustion engine 12, can be coupled to a drive train 24 of the vehicle 10. In other words, the vehicle 10 can be a hybrid vehicle.

A programmable control unit 26 of the vehicle 10 having a processor can control the injection system 14, the pressure control valve 18, the high-pressure pump 16 and the suction control valve 20. By means of the control unit, it is possible to carry out a method for controlling the fuel pressure in the injection system 14 as it is described with reference to the two following figures.

Figure 2:
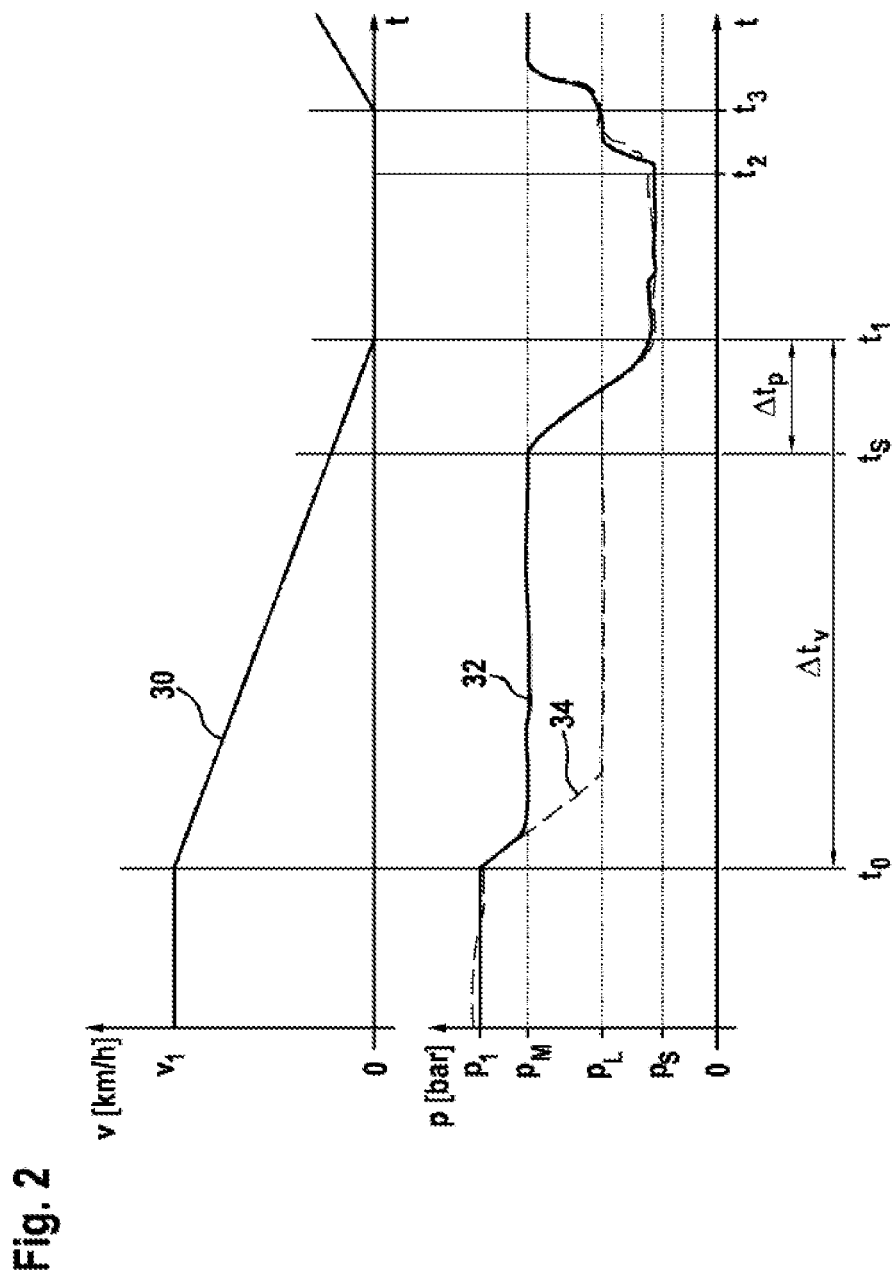
FIG. 2 shows a diagram by means of which a method for controlling a pressure in an injection system of a vehicle according to one embodiment of the invention is explained.

In the upper region, FIG. 2 shows a diagram indicating the speed 30 of the vehicle 10 against the time t, describing a start/stop mode of the vehicle 10.

Before time $t_0$, the vehicle is traveling at a constant speed $v_1$. At time $t_0$, the driver of the vehicle 10 begins to brake, the vehicle decelerates between times $t_0$ and $t_1$ and, at time $t_1$, comes to a standstill and the engine 12 of the vehicle 10 is switched off. Later, at time $t_2$, the driver steps on the accelerator pedal in order to accelerate the vehicle 10 again, and the engine 12 is restarted at time $t_2$. After a restarting and idling phase between times $t_2$ and $t_3$, the vehicle 10 begins to drive away at time $t_3$ and to accelerate again.

The control unit 26 is embodied to determine that the vehicle 10 should be decelerated. For this purpose, current vehicle data, such as a determined position of the accelerator pedal lever or of the brake pedal lever, can be used, for example.

From the overrun transition of the vehicle 10 at time $t_0$, i.e. during the deceleration, the mean deceleration of the vehicle 10 is estimated by the control unit 26 from further current vehicle data, such as the current speed. From the mean deceleration, the control unit 26 can then calculate the time period $\Delta t_v$ until the vehicle 10 is stationary at time $t_1$. This calculation can be repeated at regular intervals after time $t_0$ in order to take account of a changing current deceleration.

In the lower region, FIG. 2 shows a diagram indicating the pressure 32 in the injection system 14 of the vehicle 10 against time t.

While the vehicle 10 is moving at the constant speed $v_1$, the injection system 14 has a pressure $p_1$ of approximately 1100 bar, for example.

After time $t_0$, when an intended deceleration of the vehicle has been detected, the engine 12 then remains in overrun mode (i.e. remains coupled to the drive train 24) and the pressure 32 in the injection system 14 is throttled back as far as is possible with the pressure control valve 18 by the control unit 26, i.e. to the minimum injection pressure $p_M$, which can be approximately 900 bar, for example.

As an alternative or in addition, the vehicle 10 can be in recovery mode, in which the electric motor 22 is used as a generator in order to convert kinetic energy into electric current via the drive train 24.

From the current pressure 32 in the injection system 14 and known (predetermined) data of the injection system, such as the fuel volume present in the injection system and the fuel volume injected while the engine 12 is idling, the control unit 26 determines the time period $\Delta t_P$ required to reduce the pressure 32 in the injection system 14 to a desired (predetermined) standstill pressure $p_S$.

The standstill pressure $p_S$ corresponds to the pressure 32 at which the engine 12 should be switched off at time $t_1$ and then subsequently restarted at time $t_2$. $p_S$ can be determined so as to be thermodynamically optimal for restarting the engine and is approximately 300 bar, for example.

For example, the time period $\Delta t_P$ is 3.6 seconds at an initial pressure in the case of the minimum injection pressure $p_M$ of 900 bar, a final pressure in the case of the standstill pressure $p_S$ of 300 bar, a volume of the injection system 14 of 70 cm$^3$ and an injection volume of 20 mm$^3$ with 6 cylinders and 600 rpm.

From the time period $\Delta t_P$ and the time $t_1$ at which the vehicle 10 will probably come to a standstill, the control unit determines the time $t_S = t_1 - \Delta t_P$ from which the pressure 32 in the injection system 14 should be reduced, ensuring that the desired pressure $p_S$ prevails at time $t_1$. In the calculation of $t_S$, it is also possible to take account of delay times, which may be caused by finite switching times, for example.

At time $t_S$, the control unit 26 reduces the delivery rate of the high-pressure pump 16 (e.g. fully to 0) by closing the suction control valve 20 in an appropriate manner and separates the engine 12 from the drive train 24, with the result that the engine 12 is run at idle. By means of idling injections, the pressure 32 in the injection system 14 is then reduced to a defined, applicable desired value $p_S$.

In order as far as possible to separate the vehicle overrun from the engine idling required for the pressure reduction and thus to allow to a large extent the recovery process which is possible, for example, in a topology-dependent manner in hybrid vehicle applications, engine idling is demanded and implemented on the basis of the time estimates described above only at the latest possible time $t_S$ before the vehicle stops at time $t_1$.

If there is a discontinuation of the deceleration before the vehicle stops at time $t_1$, the correct injection pressure for continued travel or acceleration is always assured up to a certain point since the pressure reduction to the standstill pressure $p_S$ takes place only at the latest possible time $t_S$ shortly before the vehicle 10 stops.

In FIG. 2, another possible pressure profile 34 for the pressure in the injection system 14, which arises during deceleration in an engine idling mode, is shown for comparison.

Figure 3:
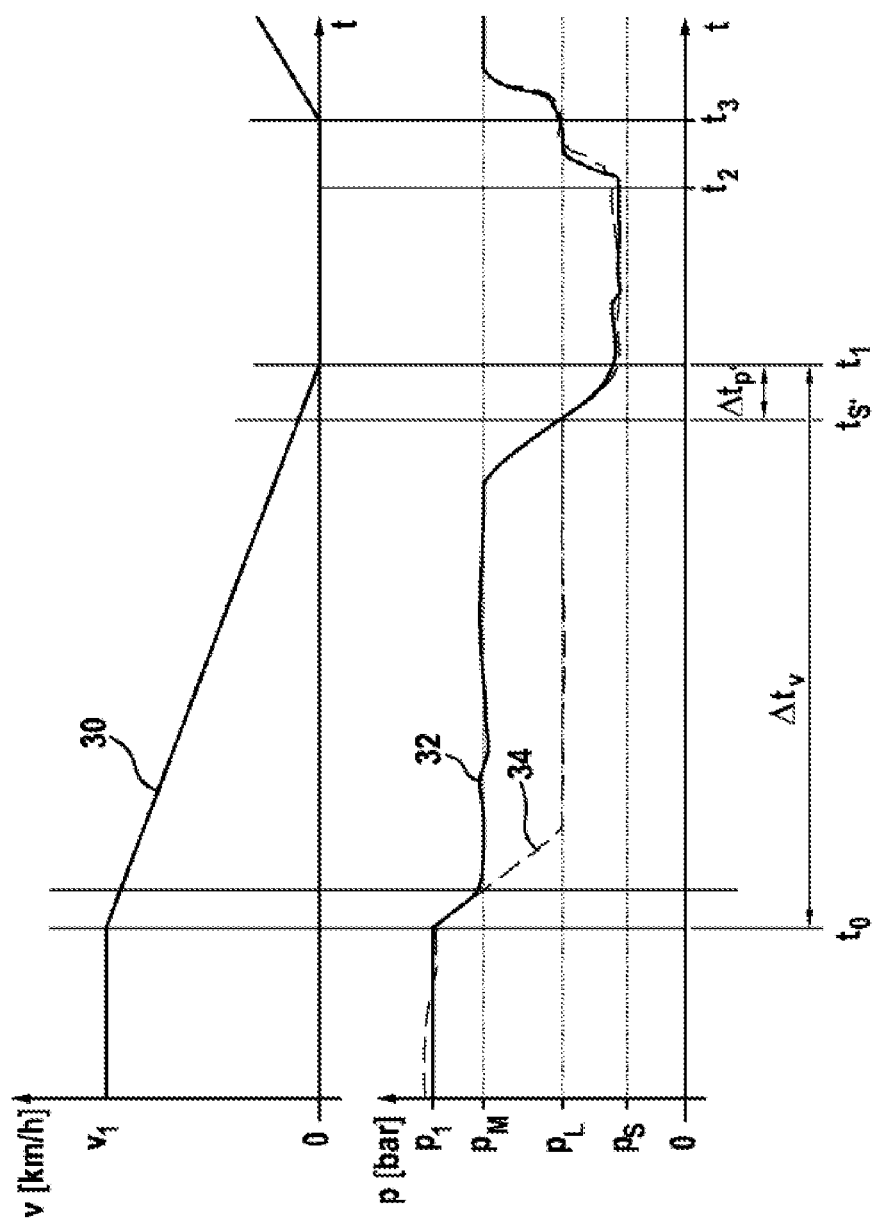
FIG. 3 shows another diagram, by means of which a method for controlling a pressure in an injection system of a vehicle according to one embodiment of the invention is explained.

This process is illustrated in FIG. 3, which shows a diagram similar to FIG. 2.

In contrast to the sequence in FIG. 2, the engine 12 is separated from the drive train 24 (e.g. by opening a clutch) shortly after time $t_0$, at which a desired deceleration is detected. After this, the vehicle is in a "free rolling" mode, in which free rolling with the clutch open and without recovery can take place. The engine 12 is then idling.

As a result, the pressure 34 during the beginning of the deceleration phase already falls to an idling pressure $p_L$, which can be 600 bar for example. The injection pressure 34 is therefore initially reduced by injection to the applied idling pressure $p_L$ by a procedure in which the control unit 26 opens the pressure control valve 18 and operates the engine 12 in the idling mode.

Similarly to FIG. 2, the control unit 26 then determines the time periods $\Delta t_V$, $\Delta t_P$ and the time $t_S'$, wherein however the current pressure which forms the starting point is now the idling pressure pL.

The time period $\Delta t_P'$ before the forecast vehicle standstill or engine stop at time $t_1$, the pressure reduction to $p_S$ is demanded by the control unit 26 using a setpoint pressure, e.g. by the suction control valve 20 being closed at time $t_S'$.

In addition it should be noted that "comprising" does not exclude other elements or steps and "a" or "one" does not exclude a multiplicity. It should furthermore be noted that features or steps which have been described with reference to one of the above illustrative embodiments can also be used in combination with other features or steps of other illustrative embodiments described above. Reference signs in the claims are not to be regarded as restrictive.

The invention claimed is:

1. A method for controlling a pressure in an injection system for an engine of a vehicle, the method comprising the following steps:
    determining whether the vehicle is decelerating;
    reducing the delivery rate of a high-pressure pump that supplies fuel to the injection system;
    reducing the pressure in the injection system to a standstill pressure by means of idle operation of the engine;
    estimating a standstill time at which the vehicle comes to a standstill; and
    reducing the delivery rate of the high-pressure pump before the standstill time is reached, with the result that the standstill pressure is attained in the injection system at the standstill time.

2. The method as claimed in claim 1,
    wherein the standstill time is estimated on the basis of an average deceleration since the beginning of the deceleration of the vehicle.

3. The method as claimed in claim 1, further comprising the following step:
    determining a time period required to reduce the pressure in the injection system to the standstill pressure by means of idle operation;
    wherein the delivery rate of the high-pressure pump is reduced at a time which is in the determined time period before the standstill time.

4. The method as claimed in claim 3,
    wherein the time period is calculated on the basis of a volume of the injection system and an injected volume of fuel in idle operation.

5. The method as claimed in claim 1, further comprising the following steps:
    operating the engine in an overrunning mode and/or a recovery mode during a time period in which the vehicle is decelerating, with the result that the pressure in the injection system is reduced to a minimum injection pressure defined by a pressure control valve; and
    separating the engine from a drive train when the delivery rate of the high-pressure pump is reduced.

6. The method as claimed in claim 1, further comprising the following steps:
    separating the engine from a drive train while the vehicle is decelerating;

operating the engine in an idling mode during a time period in which the vehicle is decelerating, with the result that the pressure in the injection system is reduced to an idling pressure.

7. A computer program which, when performed on a processor, causes the processor to carry out the steps of the method as claimed in claim 1.

8. A computer-readable medium on which a computer program as claimed in claim 7 is stored.

9. A control unit for controlling a pressure in an injection system, the control unit programmed to
  determine whether the vehicle is decelerating;
  reduce the delivery rate of a high-pressure pump that supplies fuel to the injection system;
  reduce the pressure in the injection system to a standstill pressure by means of idle operation of the engine;
  estimate a standstill time at which the vehicle comes to a standstill; and
  reduce the delivery rate of the high-pressure pump before the standstill time is reached, with the result that the standstill pressure is attained in the injection system at the standstill time.

10. A vehicle comprising:

an engine, an injection system for injecting fuel into the engine;

a high-pressure pump for supplying the injection system with fuel; and a control programmed to determine whether the vehicle is decelerating;

reduce the delivery rate of a high-pressure pump that supplies fuel to the injection system;

reduce the pressure in the injection system to a standstill pressure by means of idle operation of the engine;

estimate a standstill time at which the vehicle comes to a standstill; and reduce the delivery rate of the high-pressure pump before the standstill time is reached, with the result that the standstill pressure is attained in the injection system at the standstill time.

\* \* \* \* \*